United States Patent
Fournier et al.

(10) Patent No.: US 10,563,314 B2
(45) Date of Patent: Feb. 18, 2020

(54) HYDROMETALLURGICAL PROCESS TO PRODUCE PURE MAGNESIUM METAL AND VARIOUS BY-PRODUCTS

(71) Applicant: ALLIANCE MAGNÉSIUM INC., Brossard (CA)

(72) Inventors: Joël Fournier, Carignan (CA); Laury Gauthier, St-Apollinaire (CA)

(73) Assignee: ALLIANCE MAGNÉSIUM INC., Brossard QC (CA)

( * ) Notice: Subject to any disclaimer, the term of this patent is extended or adjusted under 35 U.S.C. 154(b) by 268 days.

(21) Appl. No.: 15/325,843

(22) PCT Filed: Jul. 17, 2015

(86) PCT No.: PCT/CA2015/050670
§ 371 (c)(1),
(2) Date: Jan. 12, 2017

(87) PCT Pub. No.: WO2016/008056
PCT Pub. Date: Jan. 21, 2016

(65) Prior Publication Data
US 2017/0159190 A1 Jun. 8, 2017

Related U.S. Application Data

(60) Provisional application No. 62/026,105, filed on Jul. 18, 2014.

(51) Int. Cl.
C25C 3/04 (2006.01)
C25C 3/00 (2006.01)
(Continued)

(52) U.S. Cl.
CPC ............... C25C 1/02 (2013.01); C01F 5/30 (2013.01); C01F 5/32 (2013.01); C01F 11/462 (2013.01);
(Continued)

(58) Field of Classification Search
CPC .. C25C 3/04; C25C 7/005; C25C 3/00; C25C 7/025; C25C 3/08; C25C 7/02; C25C 5/04; C25C 7/00
(Continued)

(56) References Cited

U.S. PATENT DOCUMENTS 2,398,493 A * 4/1946 Butt ................. C01F 5/30
205/404
5,112,584 A 5/1992 Medjell et al.
5,980,854 A 11/1999 White et al.

FOREIGN PATENT DOCUMENTS

CN 103408043 11/2013
RU 2118406 8/1998
(Continued)

*Primary Examiner* — Zulmariam Mendez
(74) *Attorney, Agent, or Firm* — Norton Rose Fulbright

(57) ABSTRACT

The present description relates to a process for producing magnesium metal from magnesium-bearing ores using serpentine. The process described herein consists generally in a mineral preparation and classification followed by leaching with dilute hydrochloric acid. The slurry is filtered and the non-leached portion, containing amorphous silica is recovered. The residual solution is neutralized and purified by chemical precipitation with non activated and activated serpentine. The nickel is also recovered by precipitation at higher pH. A final neutralisation and purification step of magnesium chloride solution by precipitation allows eliminating any traces of residual impurities. The purified magnesium chloride solution is evaporated until saturation and the $MgCl_2 \cdot 6H_2O$ is recovered by crystallization in an acid media. The salt is dehydrated and subsequent electrolysis of anhydrous magnesium chloride produces pure magnesium metal and hydrochloric acid.

20 Claims, 2 Drawing Sheets

(51) Int. Cl.
| | |
|---|---|
| *C25C 5/04* | (2006.01) |
| *C25C 7/02* | (2006.01) |
| *C25C 1/02* | (2006.01) |
| *C22B 26/22* | (2006.01) |
| *C01F 5/30* | (2006.01) |
| *C01G 53/00* | (2006.01) |
| *C01F 5/32* | (2006.01) |
| *C01F 11/46* | (2006.01) |
| *C01G 53/04* | (2006.01) |
| *C21B 15/00* | (2006.01) |
| *C22B 3/10* | (2006.01) |
| *C22B 3/22* | (2006.01) |
| *C22B 3/44* | (2006.01) |
| *C22B 3/00* | (2006.01) |

(52) U.S. Cl.
CPC ........... *C01G 53/003* (2013.01); *C01G 53/04* (2013.01); *C21B 15/00* (2013.01); *C22B 3/10* (2013.01); *C22B 3/22* (2013.01); *C22B 3/44* (2013.01); *C22B 23/0423* (2013.01); *C22B 23/0469* (2013.01); *C22B 26/22* (2013.01); *C25C 3/04* (2013.01); *C25C 7/025* (2013.01); *Y02P 10/138* (2015.11); *Y02P 10/234* (2015.11)

(58) Field of Classification Search
USPC .................................. 205/373, 402, 404, 490
See application file for complete search history.

(56) References Cited

FOREIGN PATENT DOCUMENTS

| | | |
|---|---|---|
| WO | 2006001700 | 1/2006 |
| WO | 2007/106969 | 9/2007 |
| WO | 201429031 | 2/2014 |
| WO | 2014047728 | 4/2014 |
| WO | 2016/077925 | 5/2016 |

* cited by examiner

HYDROMETALLURGICAL PROCESS TO PRODUCE PURE MAGNESIUM METAL AND VARIOUS BY-PRODUCTS

CROSS-REFERENCE TO RELATED APPLICATIONS

The present application claims benefit of U.S. Provisional Application No. 62/026,105 filed Jul. 18, 2014, and is a National Phase Entry of PCT application No. PCT/CA2015/050670 filed Jul. 17, 2015, which are hereby incorporated herein by reference in their entirety.

TECHNICAL FIELD

The present disclosure relates to the production of magnesium metal and various by-products from magnesium-bearing ores.

BACKGROUND ART

Magnesium is the eight must abundant element in the earth's crust. This lightweight metal is used in many applications and recent change in emission norm by automotive industry has created a regain in the demand.

Over 75% of the primary production of magnesium is actually made by thermal process and present major environmental concern and high-energy consumption. Electrolytic route of production is also use and is generally made by electrolysis of salt from sea water or dead sea. Salt from Dead Sea generally contain less that 3.5% of magnesium.

One of the difficulties related to the use of salts is to isolate the magnesium chloride from the rest of the feed in other to produce a pure magnesium salt to be introduced into an electrolytic cell for example.

The exploitation of important deposits of serpentine for the asbestos fiber in the last decades generated huge quantities of tailings. This ore consist of more than 90% serpentine (also known as magnesium iron silicate hydroxide), mainly as lizardite $Mg_3Si_2O_5(OH)_4$ with minor antigorite (Mg, Fe)$_3Si_2O_5(OH)_4$, brucite $Mg(OH)_2$, magnetite $Fe_3O_4$, awarite $Ni_8Fe_3$, traces of chromite $Fe(Cr, Fe)_2O_4$ and chromium-rich spinel $(Cr, Fe, Al, Mg)_3O_4$.

The asbestos tailings contain between 23-27% of magnesium and can be extracted to produce pure magnesium. They also contain around 38% $SiO_2$, 1-6% Fe, 0.2-0.3% Al and 0.1-0.2% Ni. Trace amounts of others elements are also present.

Several hydrometallurgical and electrolytic processes were developed for magnesium bearing ore but none of those processes is in production at this time due to difficult operation conditions. In general the resulting magnesium chloride still contains significant amounts of impurities that must been removed before being consider as a feed material for the magnesium electrolysis production. Those impurities can conduct to a poor cell performance and result in low current efficiency. Also, those processes have for only objective to produce magnesium chloride or metallic magnesium to the detriment of secondary products with commercial value.

In the past, a method has been proposed to produce a magnesium chloride solution from siliceous magnesium minerals (U.S. Pat. No. 5,091,161). The method involves leaching the material with a hydrochloric acid solution at a temperature above 50° C. The pH is maintained below 1.5 to prevent the formation of silica gel. The leaching can be carried out in a continuous manner. The pH of the leaching solution is increased to 4.0-4.5 with magnesia to precipitate the bulk of impurities followed by solid/liquid separation to obtain magnesium chloride liquor cleansed. A second step of purification at pH 6.0-7.0 with caustic soda and chlorine gas allows to oxidize and to precipitate the residual iron and manganese. A last stage of purification is made by ion exchange column to remove trace amounts of impurities such as nickel and boron.

In a same manner, WO 2000/017408 proposes a method to produce a magnesium chloride solution from magnesium containing materials, but with a single step of impurities separation.

These processes represent a significant step forward over those known previously, but still have some disadvantages. For example, the use of caustic magnesia for iron impurity removal is costly and imposes a heavy economic burden. Also, these processes do not allow recovering the silica for future sale because it is contaminated by iron and other impurities, including nickel. Although these processes contain stages of purification, they do not allow eliminating some impurities, such as sulfates. It is known that sulfate introduction in the electrolytic cell incurs a drop of current efficiency by increasing the voltage.

To remove iron impurity from magnesium chloride brine, hydrolysis methods have been propose such as described in the WO 2014/029031 and WO 2009/153321. Briefly, the brine is first concentrated and oxidized where ferrous chloride is converted to a ferric and oxide form. Ferric chloride is subsequently hydrolyzed generating hematite and hydrogen chloride. The following reactions describe the oxidation and hydrolysis steps.

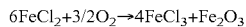

$$6FeCl_2 + 3/2 O_2 \rightarrow 4FeCl_3 + Fe_2O_3$$

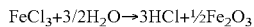

$$FeCl_3 + 3/2 H_2O \rightarrow 3HCl + \tfrac{1}{2}Fe_2O_3$$

While recovery of hydrochloric acid and hematite may be achieved using these processes, its application tends to be limited to liquors containing only ferrous/ferric chloride. When other chloride are present in large quantity in solution, for instance magnesium chloride, the activity of the chloride ions and proton tend to be too high to permit the proper functioning. Such process will work in the laboratory in batch mode but not in a continuous mode because the magnesium chloride concentration increase relative to that of iron, then the solution freezes and becomes solid. Moreover, hydrolysis method is conducted under pressure and at elevated temperature, around 200° C. It requires expensive equipment and also consumes a lot of energy. Also, the hydrolysis of a brine containing some magnesium conduct to poor purification efficiency for iron. It was observed a loss of about 6 to 11% of the magnesium while removing only 62 to 70% of the iron. Thus, hydrolysis is not a selective method and further purification steps are required. Therefore, this method cannot be viable economically for large volumes.

To concentrate a magnesium chloride brine to obtain a hydrate salt, evaporation is currently used. However, this method requires a lot of energy and consequently an important cost. For this reason, the use of evaporation must be limited.

In a same way, the electric consumption of the factories of magnesium by electrolytic process comes mainly of the electrolysis step by the decomposition voltage of the $MgCl_2$. This consumption thus has a significant impact on production cost and the profitability.

By conventional electrolysis process of magnesium in molten salt, the carbon anodes tends to decompose by reaction with $Cl_2$ emitted to form organochlorine compounds, which have a negative environmental impact. The life time of the anode is also reduced.

Accordingly, there is thus still a need to be provided with an improved global process for producing magnesium metal from magnesium-bearing ores such as asbestos tailings and to improve the overall economic by generating valuable by-product, limiting the purchase of chemical base, reducing the energy consumption and restricting the organochlorine emissions.

SUMMARY

In accordance with the present invention there is now provided a process for producing magnesium metal from magnesium-bearing ores, comprising the steps of: (a) leaching the magnesium-bearing ores with HCl obtaining a slurry comprising magnesium chloride; (b) filtrating the slurry to obtain a magnesium chloride solution and a silica by-product; (c) purifying the magnesium chloride solution by increasing the pH by adding a neutralizing agent an oxidyzing agent producing a magnesium chloride solution; (d) separating iron residues from the magnesium chloride solution; (e) recuperating nickel contained in the magnesium chloride solution by increasing a second time the pH by adding a base and recovering a nickel rich fraction by filtration; (f) adding an oxidizing agent and increasing the pH of the magnesium chloride solution a third time by adding a base and precipitating residual metallic impurities; (g) adding a neutral salt to said magnesium chloride solution precipitating sulfate ions from said magnesium chloride solution and separating metal impurities and sulfates from said magnesium chloride solution producing a pure magnesium brine; (h) evaporating water from the magnesium brine and recovering $MgCl_2.6H_2O$ by crystallization using dry gaseous hydrogen chloride; (i) dehydrating the $MgCl_2.6H_2O$ to obtain anhydrous magnesium chloride; and (j) electrolizing the anhydrous magnesium chloride in an electrolytic cell fed, containing an anode and a cathode, wherein magnesium metal is recovered.

In an embodiment, the magnesium-bearing ores are serpentine.

In a supplemental embodiment, the serpentine is magnetic serpentine.

In another embodiment, the magnetic serpentine is non activated and/or activated magnesium silicate.

In a further embodiment, the neutralizing agent is at least one of activated and non activated serpentine.

In another embodiment, the activated magnesium silicate is obtained by grinding serpentine to 250 μm or less, passing the grinded serpentine though a magnetic separator and calcined the non magnetic fraction of serpentine.

In a further embodiment, the process further comprises an initial step of grinding the magnesium-bearing ores before step (a) of leaching.

In an additional embodiment, step (b) of filtrating the slurry is a solid/liquid separation.

In another embodiment, the solid/liquid separation is conducted in a filter press or a filter press.

In a further embodiment, the pH is increase between 3 and 4 in step (c).

In another embodiment, the non magnetic serpentine is activated by calcination.

In another embodiment, the oxidyzing agent is chlorine gas, sodium chlorate, potassium chlorate, sodium chlorite, hydrogen peroxide, potassium permanganate, dioxygen, air or a mixture thereof.

In a further embodiment, the process further comprises a step of decanting the magnesium chloride solution to remove iron-residues.

In an embodiment, the iron-residues are removed from the magnesium chloride solution by at least one of decantation and centrifugation.

In another embodiment, the base is a magnesium oxide, a sodium hydroxide, a potassium hydroxide or a mixture thereof.

In another embodiment, the nickel rich fraction is recovered by precipation.

In another embodiment, wherein nickel rich fraction is captured on a chelating resin system.

In an embodiment, the chelating resin system is a DOWEX™ M4195 chelating resin.

In an embodiment, the neutral salt is barium chloride.

In a further embodiment, the metallic impurities and sulfates are separated by a solid/liquid separation from said magnesium brine after steps (f) and (g).

In another embodiment, the step (i) of dehydrating is firstly conducted in a fluidized bed dryer.

In another embodiment, the hydrous magnesium chloride ($MgCl_2.2H_2O$) is further dehydrated a second time in the fluidized bed dryer by spraying dry hydrogen chloride gas heated up to about 450° C.

In another embodiment, the electrolytic cell comprises a molten salt electrolyte.

In a further embodiment, hydrogen chloride is further recovered at and/or after step (j).

In another embodiment, the hydrogen chloride recovered is redistributed to steps (a), (h) or (i).

In another embodiment, the electrolytic cell is a monopolar or multipolar cell.

In another embodiment, the anode is a porous anode.

In another embodiment, the hydrogen gas is fed along a non-porous tube or conduit to the porous anode.

In another embodiment, the electrolytic cell is fed with hydrogen gas.

In a further embodiment, hydrogen chloride is further recovered after step j).

In another embodiment, a dehydrating unit dehydrates gaseous HCl recuperated from step (j) producing dry gaseous hydrogen chloride which is recycled back into steps (a), (h) or (i).

BRIEF DESCRIPTION OF THE DRAWINGS

Reference will now be made to the accompanying drawings.

DETAILED DESCRIPTION

It is provided a process for producing magnesium metal from magnesium-bearing ores.

In an embodiment, the magnesium-beraring ores are serpentine.

The process described herein consists in a mineral preparation and classification followed by leaching with dilute hydrochloric acid. The non-leached portion is filtrated and the residual solution is purified by chemical precipitation with no activated and activated serpentine to remove iron and other impurities. The non-dissolved part, such as iron-serpentine in the slurry, is removed. The nickel is also recovered by precipitation. A final neutralisation and purification step of magnesium chloride solution by precipitation allows eliminating any traces of residual impurities. The magnesium chloride in solution is crystallized in an acidic media. The $MgCl_2.6H_2O$ is dehydrated and subsequent electrolysis of anhydrous magnesium chloride produces pure magnesium metal and hydrochloric acid.

The process of the present disclosure can be effective for treating various magnesium silicate ores such as for example, and not limited to, lizardite, olivine, talc, sepiolite and serpentine or mixtures thereof which can be used as starting material.

The process described herein allows extracting and producing magnesium metal and various by-products from tailing, such as asbestos mine tailing, obtained after processing of magnesium-bearing ores.

Figure 1:
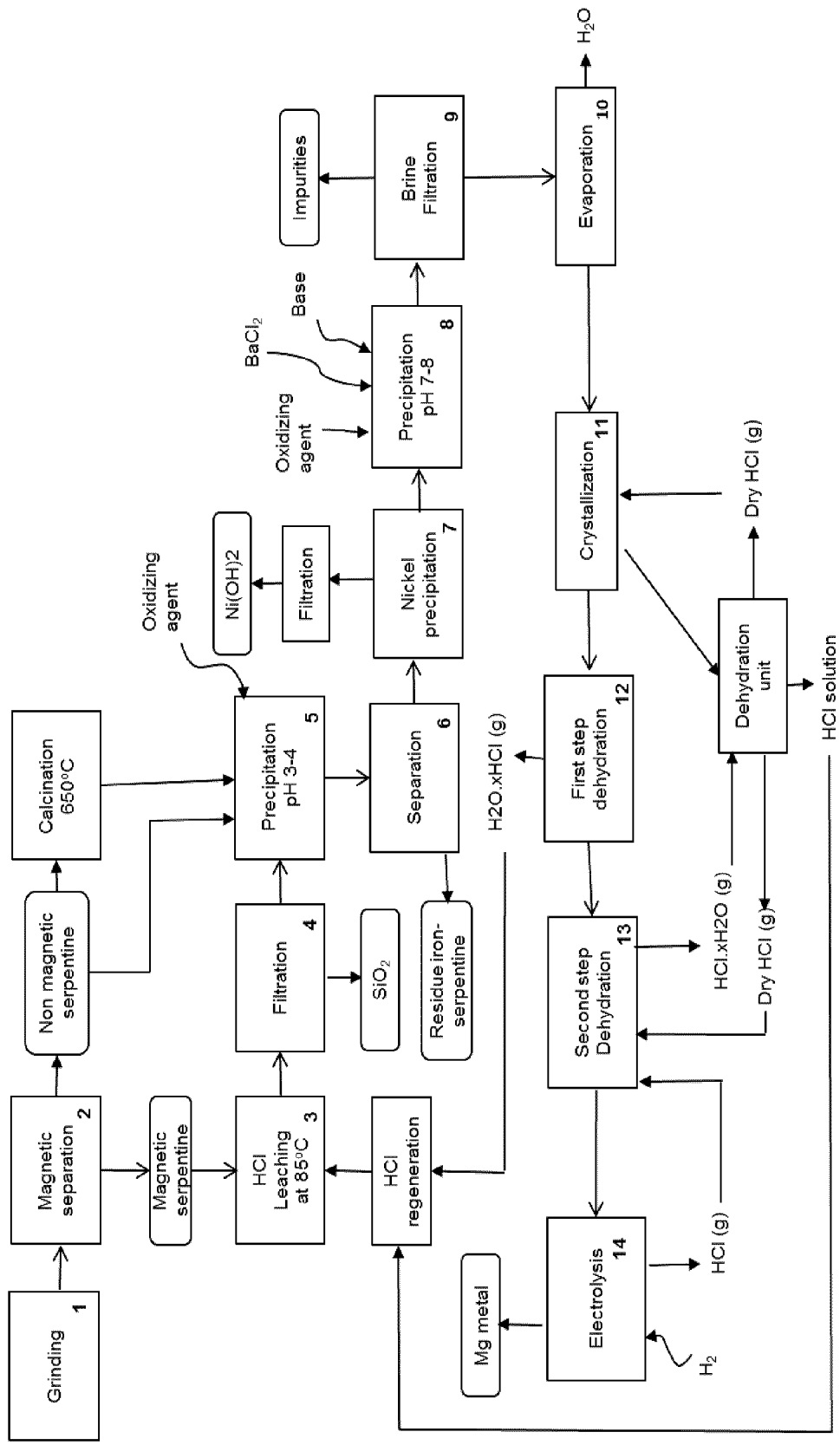
FIG. 1 illustrates a bloc diagram of a process according to one embodiment for producing magnesium metal.

As can be seen from FIG. 1, and according to one embodiment, the process comprises a first step of conditioning the starting material.

Preparation (Step 1) and Magnetic Separation (Step 2)

Adjacent to a plant, the serpentine from the pile is loaded to trucks and delivered to stone crushers for mechanical conditioning.

Tailing, and particularly asbestos tailing, can be crushed (grinding, step 1) in order to help along during the following steps. The mining tailing is reduced to pass through a screen of 250 μm. The magnetic part of crushed serpentine is recovered by magnetic separation (step 2) at low and possibly at height intensity for a better yield in nickel recovery. The percent of magnetic weight fraction for two successively separations at 1 200 and 17 000 gauss flux density on the initial material is around 40%. This stage allows to concentrate the nickel while maintaining a strong magnesium percentage in the fraction.

Serpentine tailing is a basic magnesium silicate material and contains variable amount of brucite. For these reasons, it is considered as a neutralizing agent. The dissolution of magnesium in an hydrochloric acid solution, such a leachate, is relatively efficient at pH below 1 but lower at high pH values. In this case, an appreciable quantity of material is necessary to increase the pH.

The serpentine used for precipitation is also subject to leaching by acidic dissolution but this dissolution is less effective as the pH would progressively increase. The primary magnetic separation of fraction provided herein optimizes the nickel extraction from the entire ore and have a positive economic impact on the overall process.

In a supplemental embodiment, the serpentine is magnetic serpentine.

In another embodiment, the magnetic serpentine is non activated and activated magnesium silicate.

Calcination of serpentine influences the dissolution behaviour of magnesium and allows to obtain a better yield on the base of the material used. During calcination, water is released causing a disordered material. Between 575 and 700° C., the serpentine breaks up in active magnesia and silica. The degree of activation varies according to the calcination time and the grain size of material. The use of serpentine as a neutralizing agent allows to enrich the brine in magnesium and increase the production yield of the magnesium metal.

From the magnetic separation process, the residual non magnetic fraction is used for calcination and more preferably fine-grained, by passing through a screen of 106 μm. Activated serpentine is introduced in step 5 as a neutralizing agent as explained herein below. The following table is a typical analysis of serpentine tailing.

TABLE 1

Elementary Composition of serpentine, non magnetic and magnetic fractions

| Composition (%) | Serpentine tailing | Magnetic fractions | | No magnetic fractions | |
|---|---|---|---|---|---|
| | | (1200 gauss) | (17000 gauss) | (−106 μm) | (−177 to +125 μm) |
| SiO2 | 38.9 | 28.9 | 39.5 | 41.7 | 43.1 |
| Al2O3 | 1.73 | 1.30 | 1.14 | 2.36 | 2.79 |
| Fe2O3 | 7.91 | 29.9 | 5.48 | 3.59 | 3.76 |
| MgO | 36.3 | 27.7 | 38.5 | 37.0 | 37.6 |
| CaO | 0.91 | 0.53 | 0.52 | 1.66 | 1.68 |
| Na2O | 0.19 | 0.13 | 0.09 | 0.22 | 0.28 |
| K2O | 0.27 | 0.16 | 0.12 | 0.36 | 0.47 |
| TiO2 | 0.05 | 0.03 | 0.03 | 0.06 | 0.07 |
| P2O5 | 0.02 | 0.02 | <0.01 | 0.07 | 0.03 |
| MnO | 0.11 | 0.11 | 0.11 | 0.12 | 0.11 |
| Cr2O3 | 0.37 | 0.88 | 0.46 | 0.22 | 0.16 |
| LOI | 13.9 | 9.83 | 14.3 | 12.9 | 10.2 |
| Sum | 100.7 | 99.4 | 100.2 | 100.3 | 100.3 |
| Ni | 0.21 | 0.54 | 0.31 | ND | ND |
| Co | 0.01 | 0.03 | 0.02 | ND | ND |
| S | 0.02 | ND | ND | ND | ND |

ND: Not determined
Source: SGS report

Leaching (Step 3)

The magnetic fraction is leached in an hydrochloric acid solution during a given period of time which allows dissolving the magnesium and other elements like iron and nickel. The silica remains totally undissolved after leaching.

The leaching is conducted at a temperature between 60 to 125° C., for example at 80° C. These conditions are possible due to the high salt content in the reaction mixture preventing aqueous solution from boiling. The leaching reaction converts most magnesium, iron, aluminum, potassium, calcium, nickel and manganese into water-soluble chloride compounds. A significant portion of material is inert to HCl digestion and remain solid in the reaction mixture.

Filtration and Purification (Steps 4 and 5)

The slurry then undergoes a solid/liquid separation by suitable filtration equipment, such as belt filter or filter press (step 4) to recuperate amorphous silica ($SiO_2$) characterised by a very large surface area. This silica have shown to have a good purity and potentially been having an economical importance.

Subsequently, the magnesium chloride liquor then undergoes a purification step (step 5) by neutralization to remove dissolved iron and others chloride impurities accessible to precipitation at the targeted pH value. To precipitate the bulk of impurities, pH is increased until 3-4 by the addition of non magnetic serpentine (non activated and activated serpentine) or others magnesium silicate minerals capable of neutralizing. The base content neutralizes the acidity of brine and converts contaminants into insoluble form. The use of serpentine tailing, such as the non magnetic fraction, constitute an economic advantage over previous proposed processes as it is available on the site and provide a saving in chemical addition and transport. Also, the combination of serpentine non activated and activated for the neutralization allows to limit the quantity of material to be calcined. Purification by precipitation is a cost-effective method under easy operation conditions as compare to hydrolysis. Accordingly, a neutralizing agent such as activated and/or activated non activated serpentine.

The weight of serpentine to be added depends on the amount of free hydrochloric acid in the leachate and the amount of impurities which can be precipitated in the targeted pH. During the neutralization step, the temperature is maintained at around 80° C. to favor the dissolution of serpentine. The magnesium concentration in the brine thus increases and the iron content dissolves at first and precipitate afterwards.

An oxydizing agent is added to convert bivalent iron to trivalent iron such as chlorine gas, sodium or potassium chlorate, sodium chlorite, hydrogen peroxide, potassium permanganate, dioxygen, air, or a mixture thereof. This conversion allows to eliminate all the iron at low pH and so to avoid contaminating the nickel which precipitates into the same range of pH as the $Fe^{2+}$.

Separation (Step 6)

Iron and other impurities (iron-serpentine residues) precipitated as well as the portion of not dissolved serpentine are then separated from the second slurry by decantation or centrifugation.

Nickel Recovery (Step 7)

After the purification and separation steps, nickel in chloride solution can also be precipitated as an hydroxide by increasing the pH with a base, such as magnesium oxide, sodium hydroxide, potassium hydroxide or a mixture thereof, until pH 6-7. The nickel precipitation step is made at 80° C. The metal is then recovered by filtration.

Alternately, the magnesium chloride solution can pass a set of ion exchange resin beds comprising a chelating resin system to catch specifically the nickel. For example, the DOWEX™ M4195 resin can be used for recovering nickel from acidic brine solution. In U.S. Pat. No. 5,571,308, the use of a selective resin to remove the nickel from a leach liquor is described. The absorbed element is furthermore recovered from the ion exchange resin by contacting this one with a mineral acid whish eluted the nickel.

Nickel oxide (NiO) or nickel (Ni) can be obtained by pyro-hydrolysis or electrowining of the nickel solution.

Purification at Neutral pH (Step 8)

The pH of the magnesium solution is increased until 7-8 by addition of a base, such as for example sodium hydroxide, to eliminate by precipitation the residual metals impurities. The temperature of the solution is maintained at around 80° C. Also, an oxidizing agent is added to convert bivalent manganese into quatrivalent manganese (such as potassium permanganate as an example). At this pH, the best oxidation kinetics of $Mn^{2+}$ is obtained. This step allows to eliminate the manganese at neutral pH than higher for $Mn^{2+}$ species, such pH>11.

The magnesium brine contains sulfates ions and it's preferable to eliminate them to increase the performance of magnesium chloride electrolysis.

Barium chloride is used as a neutral salt with a good solubility in aqueous solution. It reacts with sulfates to form a white precipitate.

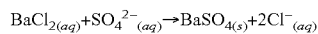

Filtration (Step 9)

The metal impurities and barium sulfate precipitated are eliminated from solution by a solid/liquid separation, such a filtration, to obtain a relatively pure magnesium brine. $CaCl_2$, KCl and NaCl are not considered as impurities because they are the constituents of electrolyte used in electrolytic cells.

Evaporation and Crystallization (Steps 10 and 11)

The solution from the filtration step is evaporated until the magnesium chloride concentration reaches the saturation. It is know that the solubility of $MgCl_2$ in water at 100° C. is 727 g/L. The presence of small amounts of other salts in the media, such Ca, K and Na, does not affect significantly the solubility. The concentrate solution is transferred in a crystallizer where magnesium chloride is precipitated further to the addition of dry gaseous hydrogen chloride.

In a concentrated HCl solution, the salt solubility decreases by the common ion effect.

Crystallization is conducted in a crystallizer known in the art and the HCl is sparged or bubbled through the liquid cooled (procedure also known as gas flushing) to facilitate its absorption. For a maximum yield of magnesium chloride recovery, HCl is introduced into the solution until the concentration reaches 34-37%. This technique allows saving energy by avoiding evaporating all the water as the conventional process. The salt, in hexahydrate form, is separated of the brine by continuous filtration.

The saturated acidic solution with low content of magnesium is further used to dehydrate gaseous HCl from the dehydration step of $MgCl_2.2H_2O$ as explained in the next section. In a dehydrating unit comprising a condenser, hydrous HCl is desiccated by contact with the cold solution which acts as a dehydrating agent. The solubility of hydrogen gas is weak in an almost saturated solution, consequently the gas tends to volatilize and the solution enriched in water. A part of dry HCl is returned to the crystallizer, and the other, to dehydrate new arrival of $MgCl_2.2H_2O$. The residual HCl solution is combined with acidic water vapor from first dehydration step of magnesium chloride and the mixture is directed to leaching step.

Dehydration (Steps 12 and 13)

The hydrate magnesium chloride then undergoes a dehydration process to produce a partially dehydrated product ($MgCl_2.2H_2O$).

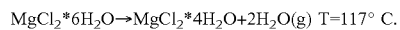

This step is performed by using indirect gas heaters, which also serve to fluidize the bed in the dryer. The magnesium chloride air-drying is carried-out in two or three stages and temperature are selected to optimise drying and minimize oxidation.

To remove the last water molecules (step 13), the salt are sent a second time in a fluid bed where dry hydrogen chloride gas at about 450° C. is sprayed. Alternatively, the magnesium chloride hydrate can be dried by using a rotary kiln or a spray drier under an HCl gas atmosphere.

This stage is performed with heated gaseous HCl to prevent hydrolysis and to obtain dry magnesium chloride with magnesium oxide qualities of about 0.1%. In the presence of air at high temperature, the magnesium oxidizes partially converts into an undesirable product, such as MgOHCl. The use of gaseous HCl will fundamentally reduce the hydrolysis reactions, thus reducing the concentration of magnesium oxide in the product. In addition, opposite reactions to hydrolysis take place with HCl, which also reduce the concentration of magnesium oxide.

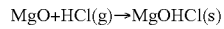

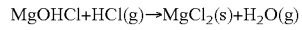

The reason for this is to avoid negatives consequences. If magnesium oxide is present in $MgCl_2$, it will be later concentrated as sludge in the electrolysis cells and will react with the graphite anodes and negatively affect the energy efficiency of the process. Also, a proportion of feed material will be lost during the process by its no transformation in magnesium metal.

The hydrate HCl gas released is then dehydrated by contact with a saturated hydrochloric acid solution generated in step 11, which also contains a low percentage $MgCl_2$. The presence of this salt increases the volatility of HCl. In a saturated solution, the solubility of hydrogen gas is weak. The gas tends to volatilize and the solution enriched in water.

Electrolysis (14)

Magnesium metal is then obtained by further electrolysis of the magnesium chloride (step 14).

Encompassed herein are processes for the electrolytic production of magnesium from magnesium chloride in an electrolytic cell having an anode and a cathode as described in WO 2014/124539, the content of which is incorporated herein by reference. The magnesium chloride are fed to electrolysis cells.

Accordingly, pure magnesium metal can be obtained by electrolytic production comprising the steps of electrolysing magnesium chloride obtained from the steps described hereinabove in a molten salt electrolyte in an electrolysis cell having a cathode and an anode, with formation of magnesium metal at the cathode, feeding hydrogen gas to the anode and reacting chloride ions at the anode with the hydrogen gas to form hydrogen chloride, recovering the magnesium metal from the cell, and recovering the hydrogen chloride from the cell.

Also encompassed herein is the used of known electrolytic cell wherein no hydrogen gaz is fed. Furthermore, also encompassed herein an electrolytic step wherein only magnesium metal is recovered and hydrogen chloride can be generated as a separate step if desired or even not generated.

The electrolysis cells are of monopolar or multipolar type. The electrolyte composition allows the magnesium metal produced to form a light phase floating on top of the electrolysis bath. The anode can be a high surface area anode, such as for example, a porous anode in which case an hydrogen gas permeates the pores of the anode, such as by diffusion, or molten electrolyte containing the magnesium chloride permeates the pores of the anode, to provide the contact between the hydrogen gas and the chloride ions. This novel design of the electrolytic anode allows the injection of hydrogen in the bath. The hydrogen gas may be fed along a non-porous tube or conduit to the porous anode. If this tube or conduit is in contact with the bath it should not be of a material which will function as an anode for the electrolysis.

Alternatively, any anode having a structure permitting delivery of hydrogen to the cell bath at the anode may be employed, such as for example but not limited to, an anode having drilled channels for communication with a source of hydrogen gas. Suitable anodes may be of graphite, silicon carbide or silicon nitride.

The hydrogen gas will then react with the native chlorine atoms on the surface of the electrode, where they are being created. This mechanism will produce dry hydrochloric acid gas directly at the electrode's surface and increases the cell's efficiency. Hydrogen diffusion anodes are known to be used for the electrochemical oxidation of hydrogen and/or electrochemical reduction of oxygen in hydrogen fuel cells, metal/air batteries, etc. The use of a hydrogen diffusion anode provides a way to protect the carbon from oxidation by chlorine by providing the reducing $H_2$ gas at the interphase.

During conventional magnesium electrolysis, $MgCl_2$ decomposes into liquid magnesium at the cathode and gaseous chlorine at the anode according to the Eq. 1. In this case, the theoretical voltage of the reaction is 2.50 V.

$$MgCl_2 \rightarrow Mg + Cl_2 \qquad (eq.\ 2)$$

For the process using hydrogen gas diffusion anode, the overall reaction becomes:

$$MgCl_2 + H_2 \rightarrow Mg + 2HCl \qquad (eq.\ 3)$$

For such a reaction, the decomposition voltage decreases to 1.46 V, allowing a theoretical voltage reduction of about 1V, the overall cell voltage could reach a reduction of 0.86 V. This represents a reduction of 25% in energy consumption.

Furthermore, as seen in FIG. 1, HCl is recuperated as a as by-product of the process. Since the purification process of $MgCl_2$ salt consumes gaseous HCl for the dehydration step for example, or leaching step, this is of great interest to produce on-site the HCl required for this process. This lead to economic benefits and a simplification of the process because the dry HCl produced by electrolysis could be directly used for the dehydration process. The theoretical amount of HCl which can be produced during magnesium electrolysis can be estimated from Eq. 4:

$$Q = \frac{i \times t}{n(e-) \times f} \qquad (eq.\ 4)$$

where i is the current (A), $n(e^-)$ the number of electron exchanged (in the present case $n(e^-)=1$ per mole of HCl), F the Faraday constant and t the electrolysis time (s). Thus, the maximum amount of HCl which could be extracted from the electrolysis process and supplied to the $MgCl_2$ dehydration facilities may theoretically reached $37.3\ 10^{-3}\ mol\ h^{-1}\ A^{-1}$. Therefore, for one electrochemical cell running at 300 kA, about 410 kg of gaseous HCl could be produced per hour.

Additionally, the formation of HCl instead of $Cl_2$ at the anode could drastically reduce the formation of undesirable organochlorine compounds, leading to a more ecological process and best fitting the increasing restriction concerning the greenhouse gas emissions. As additional benefit, by reducing the reaction of chlorines with the carbon of the anode, the life time of this one will be increased, leading to a decrease of the anode replacement frequency and consequently to a lower Mg production cost.

The present disclosure will be more readily understood by referring to the following examples which are given to illustrate embodiments rather than to limit its scope.

EXAMPLE I

Leaching

To confirm the extraction of magnesium and nickel, magnetic fraction of serpentine tailing presented in Table 1 was leached under the conditions presented below. At the end of this step, the slurries were filtered and the leachates analyzed to know the yield of extraction of several elements. The experiments were realized in an apparatus under reflux and agitation. Magnesium extraction was beyond 90% and around 100% for nickel.

TABLE 2

Yield of soluble elements extraction

| Elements | Leaching 1 Conditions 300 g magnetic 1200 + 17000 proportion 50:50 HCl 7M Stochiometry 1.05 90 minutes 85-90° C. Yield of extraction % | Leaching 2 Conditions 150 g magnetic 1200 + 17000 proportion 50:50 HCl 7M Stochiometry 1.05 120 minutes 85-90° C. Yield of extraction % | Leaching 3 Conditions 200 g magnetic 1200 HCl 7M Stochiometry 1.05 120 minutes 80-85° C. Yield of extraction % |
| --- | --- | --- | --- |
| Al | 57 | 58 | 54 |
| Cr | 18 | 24 | 24 |
| Co | 60 | 67 | 87 |
| Ca | 22 | 27 | 34 |
| Fe | 96 | 98 | 118 |
| Mg | 93 | 92 | 113 |
| Mn | 70 | 74 | 84 |
| Ni | 114 | 98 | 116 |
| K | 63 | 50 | 50 |
| Ti | 23 | 35 | 37 |
| Silica residu | 169 g | 76 g | 79 g |

The next table shows the chemical composition on oxide base and the specific surface area of no dissolved portion from leaching 2. The high $SiO_2$ content combined with the amorphous characteristic demonstrate a great application potential in various industrial sectors.

TABLE 3

Chemical composition of silica fraction from leaching 2

| $SiO_2$ | $Al_2O_3$ | $Fe_2O_3$ | MgO | CaO | $Na_2O$ | $K_2O$ | $TiO_2$ | $P_2O_5$ | $Mn_3O_4$ | $Cr_2O_3$ | NiO | LOI | Sum |
| --- | --- | --- | --- | --- | --- | --- | --- | --- | --- | --- | --- | --- | --- |
| 88.3% | 1.1% | 2.0% | 4.6% | 1.0% | 0.1% | 0.1% | 0.1% | 0.0% | 0.1% | 1.1% | 0.0% | 1.0% | 99.5% |

BET: 390 000 $m^2/g$

EXAMPLE II

Neutralization by Serpentine Addition

Calcination of serpentine, mainly consisted by lizardite, allows its dissociation by the loss of hydration water to form magnesia and silica. The serpentine used for tests had previously been dried at 100° C. The material was calcined in crucibles in a muffle furnace at predefined temperature and time, such 650° C. for 60 minutes.

TABLE 4

Loose of weight by calcination

| Test N° | Non magnetic Fraction | Weight loosed % |
| --- | --- | --- |
| 1 | Passing −106 μm | 3.88 |
| 2 | Passing −106 μm | 3.94 |
| 3 | Passing −177 to +125 μm | 4.44 |
| 4 | Passing −177 to +125 μm | 4.48 |

To validate the efficiency of no activated and activated serpentine to neutralize, an HCl solution at pH 0.74 was prepared. For a volume of 125 ml, 10 g of material was added in five add-ons. The pH was measured 15 minutes after each addition. The tests were conducted at 80° C. as the proposed process.

TABLE 5

Increased pH by serpentine addition

| Cumulative Addition (g) | −106 μm not calcined pH | −106 μm 650° C., 60 minutes pH | −177 +125 μm 650° C., 60 minutes pH |
| --- | --- | --- | --- |
| 0.0 | 0.74 | 0.74 | 0.74 |
| 3.0 | 0.87 | 0.92 | 0.88 |
| 5.0 | 1.01 | 1.08 | 1.06 |
| 7.0 | 1.22 | 1.41 | 1.35 |
| 8.5 | 1.58 | 1.93 | 1.89 |
| 10.0 | 2.10 | 3.35 | 2.87 |
| Δ pH | 1.36 | 2.61 | 2.13 |
| Mg dissolved: | 29.7% | 31.5% | 32.3% |

Figure 2:
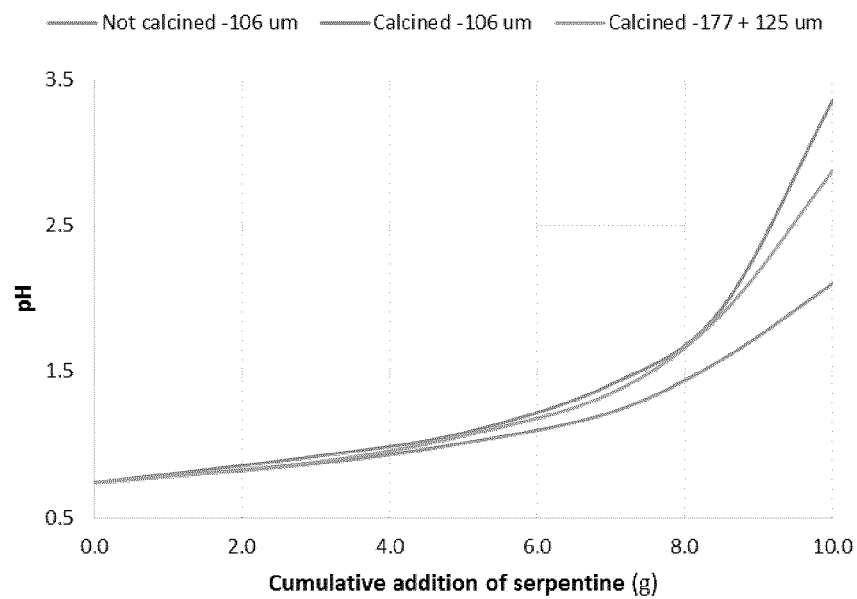
FIG. 2 illustrates the effect of the addition of serpentine on the pH of the solution.

The results demonstrate that the not activated serpentine has the same efficiency as the activated serpentine to raise the pH around 1 (see FIG. 2). However, beyond this value, its efficiency is lower for a same amount added. The calcination thus increases the capacity of material to neutralize a hydrochloric acid solution and more for fine-grained fraction. As to the magnesium dissolution, the experiment shows that the percentage is similar for all the neutralisations based on magnesium content in starting materials.

EXAMPLE III

Nickel Recovery

To recover nickel by precipitation, 741 ml of a rich magnesium solution at pH 3.8 containing nickel and impurities was heating at 80° C. and 16 ml of NaOH 3 M was added to increase the pH at 6.3. By filtration, a rich nickel fraction was obtained, which is considered as a high-value product. Table 6 shows that 89% of nickel was precipitated at this pH together with residual aluminum, iron and cobalt impurities leaving a purified magnesium solution.

TABLE 6

Precipitated elements at pH 6.3

| Elements | Liquid in (mg) | Liquid out (mg) | Precipitated elements (%) |
| --- | --- | --- | --- |
| Al | 80 | 0 | 100 |
| Fe | 13 | 0 | 100 |
| Co | 23 | 1 | 95 |
| Mn | 74 | 65 | 11 |
| Ni | 582 | 62 | 89 |

EXAMPLE IV

Sulfate Precipitation

To demonstrate the efficiency of barium chloride to precipitate sulfates, a solution at pH 7 containing 157 g/L of $MgCl_2$ and 0.37 g/L of $SO_4^{2-}$ was prepared. This one was heating at 80° C. and 0.96 g of $BaCl_2.2H_2O$ was added, such with 9% of stoichiometric excess. The solution was filtered and analyzed. The yield of sulfate removal was 97%.

EXAMPLE V

Precipitation at Neutral pH

At 431 ml of a rich magnesium brine containing 83 mg of manganese, $H_2O_2$ 30% and NaOH 1M was added to oxidize manganese and maintain the pH around 7.5-8.0. The experiment was conducted at 80° C. as the proposed process for the third stage of purification. The precipitate under oxide form was removed from the solution by filtration. The next table shows that 99% of manganese, mainly the last impurity in solution, was precipitated producing a pure magnesium brine.

TABLE 7

Manganese precipitation at neutral pH

| Elements | Liquid in (mg) | Liquid out (mg) | Precipitated elements (%) |
|---|---|---|---|
| Mg | 24700 | 24500 | 1 |
| Mn | 83 | 1 | 99 |

EXAMPLE VI

Solubility of $MgCl_2$ in HCl Media

Figure 3:
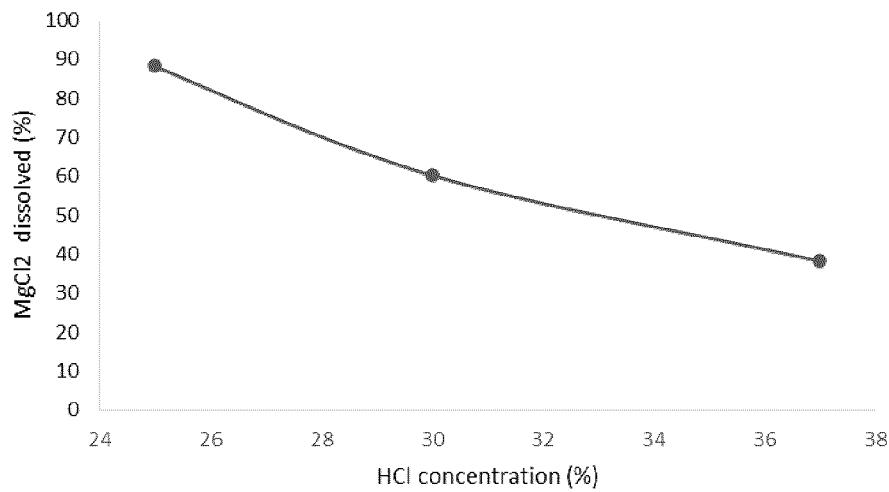
FIG. 3 illustrates the $MgCl_2$ dissolution as a function of HCl concentration.

To demonstrate the effect of hydrogen chloride concentration on the solubility of $MgCl_2$, 47 g of hexahydrate salt was added to 38 ml of HCl at 25, 30 and 37% respectively. The mixtures were stirred for 15 minutes at 35° C. under reflux. The solids were removed by filtration at 24° C. The results show that the solubility of the salt decreases with the increase of HCl concentration (see FIG. 3).

EXAMPLE VII

Iron Removal by Hydrolysis Method

To evaluate the efficiency of the hydrolysis method to remove iron from concentrated magnesium chloride solutions, experiences were made under predefined conditions. During hydrolysis, the salt concentration was kept around 40-50% in water and the temperature between 200-230° C. The reaction time was around 7 hours. Table 10 shows that only 62 and 70% of iron was hydrolysed respectively. These results confirm that this method is not effective enough to remove iron and a second method should be used to complete the purification, thus increasing the production cost. Also, a significant percentage of magnesium and nickel are hydrolysed that represent a lost.

TABLE 10

Hydrolysis of elements from concentrated chloride solutions

| Elements | Liquid in (mg) | Liquid out (mg) | Hydrolysed elements (%) | Liquid in (mg) | Liquid out (mg) | Hydrolysed elements (%) |
|---|---|---|---|---|---|---|
| Al | 34 | 1 | 97 | 21 | 0 | 100 |
| Cr | 9 | 0 | 100 | 7 | 0 | 100 |
| Co | 37 | 1 | 97 | 1 | 1 | 0 |
| Fe | 660 | 200 | 70 | 544 | 205 | 62 |
| Mg | 4483 | 4213 | 6 | 3454 | 3059 | 11 |
| Mn | 14 | 14 | 0 | 13 | 12 | 8 |
| Ni | 40 | 28 | 30 | 34 | 18 | 47 |

While the invention has been described in connection with specific embodiments thereof, it will be understood that it is capable of further modifications and this application is intended to cover any variations, uses, or adaptations of the invention, including such departures from the present disclosure as come within known or customary practice within the art to which the invention pertains and as may be applied to the essential features hereinbefore set forth, and as follows in the scope of the appended claims.

What is claimed is:

1. A process for producing magnesium metal from magnesium-bearing ores, comprising the steps of:
   (a) leaching the magnesium-bearing ores with HCl obtaining a slurry comprising magnesium chloride;
   (b) filtrating the slurry to obtain a magnesium chloride solution and a silica by-product;
   (c) purifying the magnesium chloride solution by increasing the pH adding a neutralizing agent and an oxidizing agent;
   (d) separating iron residues from the magnesium solution chloride solution;
   (e) recuperating nickel contained in the magnesium chloride solution by increasing a second time the pH by adding a base and recovering a nickel rich fraction by filtration;
   (f) adding an oxidizing agent and increasing the pH a third time of the magnesium chloride solution by adding a base and precipitating residual metallic impurities;
   (g) adding a neutral salt to said magnesium chloride solution precipitating sulfate ions from said magnesium chloride solution and separating metal impurities and sulfates from said magnesium chloride solution producing a pure magnesium brine;

(h) evaporating water from the magnesium brine and recovering $MgCl_2.6H_2O$ by crystallization using dry gaseous hydrogen chloride;

(i) dehydrating the $MgCl_2.6H_2O$ to obtain anhydrous magnesium chloride; and (j) electrolizing the anhydrous magnesium chloride in an electrolytic cell, containing an anode and a cathode, wherein magnesium metal is recovered.

2. The process of claim 1, wherein the magnesium-bearing ores are serpentine.

3. The process of claim 2, wherein the serpentine is magnetic serpentine.

4. The process of claim 3, wherein the magnetic serpentine is non activated and/or activated magnesium silicate.

5. The process of claim 1, wherein the neutralizing agent is at least one of activated and non activated serpentine.

6. The process of claim 4, wherein the activated magnesium silicate is obtained by grinding serpentine to 250 μm or less, passing the grinded serpentine though a magnetic separator and calcined a non magnetic fraction of serpentine.

7. The process of claim 1, further comprising an initial step of grinding the magnesium-bearing ores before step (a) of leaching.

8. The process of claim 1, wherein said filtrating step is conducted in a belt press or a filter press.

9. The process of claim 1, wherein the oxidizing agent is chlorine gas, sodium chlorate, potassium chlorate, sodium chlorite, hydrogen peroxide, potassium permanganate, dioxygen, air or a mixture thereof.

10. The process of claim 1, further comprising a step of decanting the magnesium chloride solution to remove the iron-residues.

11. The process of claim 1, wherein the base is a magnesium oxide, a sodium hydroxide, a potassium hydroxide or a mixture thereof.

12. The process of claim 1, wherein the nickel rich fraction is recovered by precipitation.

13. The process of claim 1, wherein the nickel rich fraction is captured on a chelating resin system.

14. The process of claim 1, wherein said metallic impurities and sulfates are separated by a solid/liquid separation from said pure magnesium brine after steps (f) and (g).

15. The process of claim 1, wherein said neutral salt is barium chloride.

16. The process of claim 1, wherein step (i) of dehydrating is firstly conducted in a fluidized bed dryer.

17. The process of claim 16, wherein the hydrous magnesium chloride is further dehydrated a second time in the fluidized bed dryer by spraying dry hydrogen chloride gas heated up to about 450° C.

18. The process of claim 1, wherein the electrolytic cell is fed with hydrogen gas.

19. The process of claim 1, wherein hydrogen chloride is further recovered at and/or after step (j).

20. The process of claim 19, wherein a dehydrating unit dehydrates gaseous HCl recuperated from step (j) producing dry gaseous hydrogen chloride which is recycled back into steps (a), (h) or (i).

* * * * *